United States Patent [19]

Keenan

[11] Patent Number: 4,725,965
[45] Date of Patent: Feb. 16, 1988

[54] METHOD FOR CALIBRATING A SCARA ROBOT

[75] Inventor: Paul A. Keenan, Newtown Township, Bucks County, Pa.

[73] Assignee: American Telephone and Telegraph Company, New York, N.Y.

[21] Appl. No.: 888,618

[22] Filed: Jul. 23, 1986

[51] Int. Cl.$^4$ ............................................. G05B 19/42
[52] U.S. Cl. ..................................... 364/513; 901/40; 901/47; 901/15
[58] Field of Search ....................... 364/513, 170, 183; 318/568, 632; 901/2, 9, 15, 40, 47

[56] References Cited

U.S. PATENT DOCUMENTS

| | | | |
|---|---|---|---|
| 3,888,362 | 6/1975 | Fletcher et al. | 214/1 B |
| 3,986,007 | 10/1976 | Ruoff | 235/151.1 |
| 4,146,924 | 3/1979 | Birk et al. | 364/513 |
| 4,187,051 | 2/1980 | Kirsch et al. | 414/744 |
| 4,273,506 | 6/1981 | Thomson et al. | 414/735 |
| 4,356,554 | 10/1982 | Susnjara et al. | 364/513 |
| 4,380,696 | 4/1983 | Masaki | 901/47 |
| 4,396,945 | 8/1983 | DiMatteo et al. | 358/107 |
| 4,402,053 | 8/1983 | Kelley et al. | 364/5 B |
| 4,445,184 | 4/1984 | Noguchi | 364/191 |
| 4,481,592 | 11/1984 | Jacobs et al. | 364/192 |
| 4,488,242 | 12/1984 | Tabata et al. | 364/513 |
| 4,568,816 | 2/1986 | Casler, Jr. | 901/47 |
| 4,581,566 | 4/1986 | Ekstrom et al. | 318/568 |
| 4,594,670 | 6/1986 | Itoh | 364/170 |
| 4,599,037 | 7/1986 | Ross, Jr. et al. | 901/40 |
| 4,657,470 | 4/1987 | Clarke et al. | 901/40 |
| 4,675,502 | 6/1987 | Haefner et al. | 901/47 |

FOREIGN PATENT DOCUMENTS 2053148A 2/1981 United Kingdom .

OTHER PUBLICATIONS

R. P. Paul, *Robot Manipulators: Mathematics, Programming and Control*, (MIT Press, Cambridge, MA, 19), pp. 50–78.

Y. C. Tasi and A. H. Soni, J. Mechanical Design 103, 803–811 (1981).

R. Ibarra and N. D. Perreira, J. Mechanisms, Transmissions, and Automation in Design 108, 159–166 (1986).

D. E. Whitney, C. A. Lozinski, and J. M. Rourke, J. Dynamic Systems, Measurement, and Control-Transactions of the ASME 108, 1–8 (1986).

R. N. Vaishnav and E. B. Magrab, "A General Procedure to Evaluate Robot Positioning Errors: Part I-Theory," Robotics Research 6, Mar. (1987).

E. B. Magrab and R. N. Vaishnav, "General Procedure to Evaluate Robot Positioning Errors: Part II-Numerical Results," Robotics Research 6, Mar. (1987).

*Primary Examiner*—Jerry Smith
*Assistant Examiner*—Allen MacDonald
*Attorney, Agent, or Firm*—R. B. Levy

[57] ABSTRACT

A technique is provided for calibrating a SCARA type robot (10) comprised of a first rotatable link (20) and a second link (32), rotatably connected at one end to the first link, and carrying a tool (40) at the other end thereof. The calibration technique relies on the fact that SCARA robots are controlled using a kinematic model, which, when accurate, allows the links to be placed in both a first and second angular configuration at which the tool (40) carried by the second link remains at the same position. To calibrate the kinematic model, the links are placed in the first configuration to locate the tool above a fixed datum point (60). Then, the links are placed in the second angular configuration to nominally locate the tool again in registration with the datum point. The error in the kinematic model is computed from the shift in the position of the tool from the datum point when the links are switched from the first to the second angular configuration. The kinematic model is then compensated in accordance with the computed error. These steps are repeated until the error reaches zero, at which time the kinematic model of the SCARA robot is calibrated.

8 Claims, 11 Drawing Figures

METHOD FOR CALIBRATING A SCARA ROBOT

TECHNICAL FIELD

This invention relates to a method for calibrating a SCARA type robot to compensate for errors therein.

BACKGROUND ART

Robots are increasingly being used in various manufacturing applications due to their ability to repetitively perform a wide variety of tasks quickly and with a high degree of accuracy. Even complex assembly tasks, such as placing small parts in a confined space, are now being performed by robots. Presently the robot of choice for many assembly operations is the "SCARA" type robot which is so named because it possess a Selectively Compliant Arm for Robotic Assembly. SCARA robots are available from a number of commercial suppliers.

Generally, a SCARA robot comprises a base having a vertical member mounted thereto for vertical movement along a z axis. A first link is journaled to the vertical member by a first joint or wrist for rotation thereabout in a horizontal plane parallel to that defined by an x and y axis, each perpendicular to, and intersecting with the z axis at a point in the base of the robot. The point of intersection of the x, y and z axes defines the frame of reference for the robot. A second link has one end thereof pivotally connected to the free end of the first link by a second joint or wrist for rotation in the same horizontal plane. One or more tools are mounted to the other end of the second link. For example, the second link may carry a television camera for observing each of several fiducial marks on an object, such as a circuit board, to allow exact position thereof relative to the robot base to be determined with very high precision. In addition, the second link may also carry a gripper for picking up and placing a part.

A servo-motor is attached to the vertical member of the SCARA robot and is rotatably coupled to the first link. A second servo-motor is attached to the first link and is rotatably coupled to the second link. The servo-motors are each energized with a control signal supplied by a control system to rotate the links to place one of the tools at a desired location. After each servo-motor has rotated its corresponding link, the magnitude of the control signal supplied to each motor to cause it to maintain the link precisely in place may be reduced. When the control signal supplied to the servo-motor is reduced, the degree to which the servo-motor will maintain the link precisely in place is reduced. Thus, when each link is displaced slightly by forces external to the servo-motor, the servo-motor will not return the link exactly to its original position. In this way, the joint, about which the link rotates, will enjoy a small degree of compliance. This characteristic makes SCARA robots very useful in certain assembly operations because the compliance or dampening of each link can compensate for small positioning errors during part placement.

In certain high-precision assembly operations, it is undesirable to make the joints compliant in the manner described above. In fact, any compliance enjoyed by the joints may lead to part misplacement. Thus, during high-precision assembly operations, the control signal supplied to each servo-motor is not reduced in magnitude so that the joints are maintained substantially rigid.

A technique now in use for programming a SCARA robot to perform a particular task is to supply the control system with the coordinates, along the x, y and z axes, of the desired location at which the tool is to be placed. For example, when the robot is to place parts on a circuit board, the control system is supplied with the coordinate locations of where the gripper is to pick up and then place the part. From feedback information supplied to the control system indicative of the present angular position of each of the links of the robot, the control system determines the rotation of each link required to displace the gripper from its present position to the desired location.

To enable the control system to determine the rotation of the links required to displace a tool from its present position to its desired location, a kinematic model of the robot is provided. The kinematic model is a set of mathematical relationships, determined by the dimensions of the robot, which serve to translate the Cartesian coordinates, representing the desired location of the tool, into the corresponding angular position of the links of the robot. In order for the control system to control the rotation of the links of the robot to achieve precise placement of the tool, the kinematic model of the robot must be accurate. The accuracy of the kinematic model is dependent on a precise knowledge of the distance between the axes of rotation of the first and second links. Also, the angle between the two links, as well as the angle between the first link and a plane passing through the x and z axes, must be available to the kinematic model. Further, the location of each tool, relative to the axis of rotation of the second link, must be precisely known.

Generally, all of the data required for the kinematic model, with the exception of the location of each tool, are known with a relatively high degree of precision. However, because each of the tools carried by the second link is often mounted thereto by the end user of the robot without the aid of precision measuring equipment, only the nominal location of each tool is known to the kinematic model. Further, during repeated operation of the robot, the tools mounted to the second link may experience vibration and strain, causing the position thereof to shift from that originally known to the kinematic model.

As long as the kinematic model employed to control the SCARA robot remains accurate, the SCARA robot is capable of exhibiting "manipulator redundancy." Manipulator redundancy is the characteristic of the robot which allows it to place a tool carried by the second link at the same location (relative to the frame of reference of the robot) while the links of the robot are in one of two separate angular configurations. In other words, when the links of the robot are initially placed in the first configuration and are then switched to the second configuration, the tool position remains the same as before. However, if any errors exist in the kinematic model of the SCARA robot, then upon switching of the links between the first and second configurations, the position of the tool will change. Thus, it is possible, using the trait of manipulator redundancy, to determine if errors exist in the kinematic model.

In practice, the inaccuracies in the kinematic model due to shifting of the tool on the robot link are usually small. Hence, the resultant position error of the tool due to inaccuracies in the kinematic model is usually not significant and can be tolerated during most assembly operations. However, in some instances, the position error attributable to inaccuracies in the kinematic model cannot be tolerated. For example, certain assembly operations, such as the placement of chip carriers on a printed circuit board, require extremely high precision. Often the position error attributable to inaccuracies in the kinematic model may be sufficiently large enough to prevent such operations from being carried out correctly. Thus, there are difficulties in using SCARA robots to carry out high-precision assembly operations.

To make use of SCARA robots in high-precision assembly operations, it would be desirable to calibrate the robot to compensate for inaccuracies. However, because the kinematic model of the SCARA robot has not been well understood in the past, no efforts were made at calibrating the robot by adjusting the model.

Accordingly, a problem exists in how to calibrate a kinematic model used to control a SCARA robot.

BRIEF SUMMARY OF THE INVENTION

The foregoing problems are substantially overcome by the method of the present invention for calibrating a SCARA type robot having a first rotatable link, and a second tool-carrying link rotatably mounted to the end thereof to compensate for errors in the robot. To calibrate the robot when an error is present therein, the links are placed in the first configuration to place the tool carried by the second link at a known location. The links are then placed in the second configuration to nominally place the tool at the same known location. The distance of the tool from the known location, once the links have been switched from the first to the second configuration, is measured. The error in the robot is determined from the measured distance of the tool from the known location, and the robot is compensated in accordance with the error. The steps are repeated until the error approaches zero.

DETAILED DESCRIPTION

Figure 1:
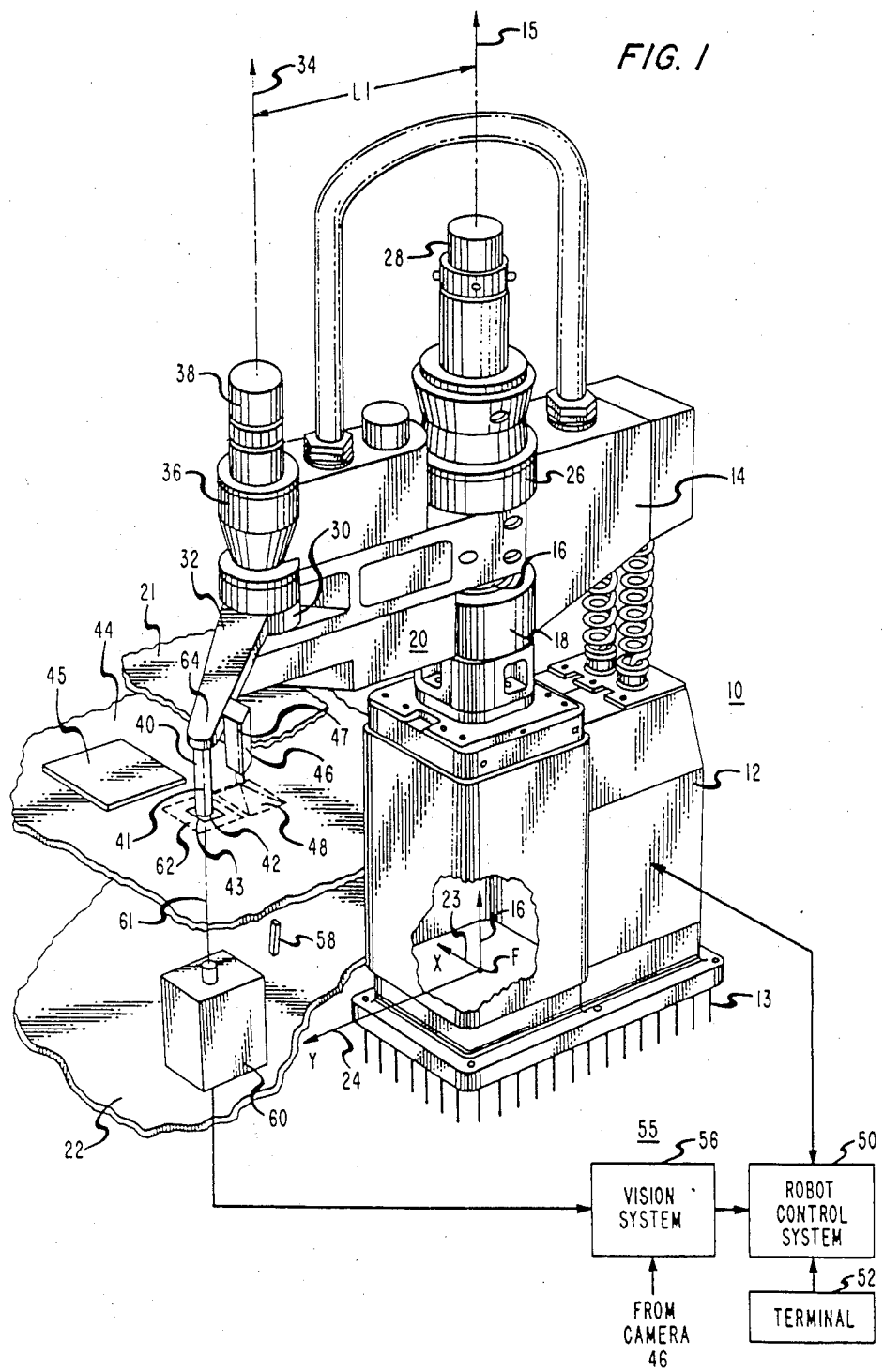
FIG. 1 is a perspective view of a SCARA type robot coupled to a system for determining the location of each tool carried by the robot.

FIG. 1 is a perspective view of a SCARA type robot 10 which, in an exemplary embodiment, comprises a mode 414 HS robot manufactured by Suwa Seikosha, Fujimi, Japan. The robot 10 comprises a base 12 rigidly secured to a stationary surface 13, such as a floor of a manufacturing facility. Within the base 12 there is a servo-driven actuator (not shown) for advancing and retracting a member 14 along a z axis 15 extending in the vertical direction. A shaft 16 has one end thereof rotatably coupled by a wrist 18 to the member 14. The opposite end of the shaft 16 is rigidly coupled to one end of a link 20. The link 20 can thus rotate about the z axis 15 in a plane 21, parallel to and spaced above a plane 22 defined by x and y axes 23 and 24, respectively, which are mutually perpendicular with the z axis 15. The x, y and z axes 23, 24 and 15 intersect at a point F within the base 12 which defines a fixed frame of reference for the robot 10.

A servo-motor 26 is attached to the member 14 and is rotatably coupled to the shaft 16 for imparting a controlled torque thereto so the link 20 may be precisely rotated in the plane 21. The servo-motor 26 is coupled to an encoder 28 which senses the angular position of the link 20 relative to a plane (not shown) passing through the x and z axes 23 and 15, respectively. A wrist 30 rotatably connects one end of a link 32 to the end of the link 20 opposite to that attached to the wrist 18. The link 32 rotates in the plane 21 about an axis 34 parallel to the axis 15 but offset therefrom. A servo-motor 36 is attached to the link 20 and is rotatably coupled to the link 32 for imparting a controlled torque thereto to precisely rotate the link within the plane 21. The servo-motor 36 has an encoder 38 coupled thereto for sensing the angular position of the link 32 relative to the link 20.

A tool 40, having a longitudinal axis 41 generally parallel to the axis 34, is attached at one end thereof to the link 32. The exact construction of the tool 40 depends on the task to be performed by the robot 10. In an exemplary embodiment, the tool 40 takes the form of a vacuum pickup device having a tip 42 at its end opposite to that attached to the link 32. The tip 42 is sized to pick up an electronic component 43 whose size has been greatly exaggerated in FIG. 1 for purposes of illustration. Once the component 43 is engaged by the tool 40, the links 20 and 32 are rotated to move the component from one location to another, the latter location being in a plane 44 parallel to, but offset from, the plane 21 by the length of the tool. In practice, the component 43 is transported by the robot 10 from the point of pickup to a predetermined location on a circuit board 45 which is supported within the plane 44 by means not shown.

In the exemplary embodiment the link 32 also carries a television camera 46 which may be thought of as a second tool. The television camera 46, which has an optical axis 47, is mounted to the link 32 so the camera looks directly downwardly at the plane 44. In other words, the optical axis 47 of the camera is generally parallel to the axes 16 and 34. The optical characteristics of the television camera 46 are selected such that the camera only captures the image within a small area 48 of the plane 44 which is enclosed within the dashed lines shown in FIG. 1. Typically, the area 48 is no larger than 3.1 by 3.1 mm. The area 48 viewed by the television camera 46 is purposely made small to achieve a very high spatial resolution for the camera. In this way, a very small object, such as a fiducial mark (not shown) on the circuit board 45 can be precisely located within the viewing area 48 relative to the center thereof which coincides with the axis 47.

The robot 10 is controlled by a control system 50 which, in an exemplary embodiment, comprises a model SRC-22 robot control manufactured by Suwa Seikosha. Input data, which take the form of the Cartesian coordinates of the desired location where the tip 42 of the tool 40, or where the axis 47 of the television camera 46 is to be placed in the plane 44, are entered to the control system 50 via an input terminal 52. Feedback information from the encoders 28 and 38, indicative of the angular position of the links 20 and 32, respectively, is also supplied to the control system 50.

Embodied within the control system 50 is a kinematic model of the robot 10 which is a series of mathematical relationships which relate the position of the tool axis 41 and the camera axis 47 in the plane 44 to the angular position of the links 20 and 32. These mathematic relationships are contained in an algorithm programmed into the robot control system 50. The kinematic model allows the control system 50 to transform the coordinates of the desired location, in the plane 44, of the tool tip 42 or the axis 47 of the television camera 46 into the angular position of the links 20 and 32 required to locate the tool tip or camera axis, respectively, at such coordinates.

In order to construct the kinematic model for the robot 10, the distance between the axes 34 and 15, hereinafter referred to as L1, must be known. Usually, a very precise value of L1 can be obtained by measuring the distance along the link 20 between the wrists 14 and 28 during fabrication of the robot 10.

Figure 2:
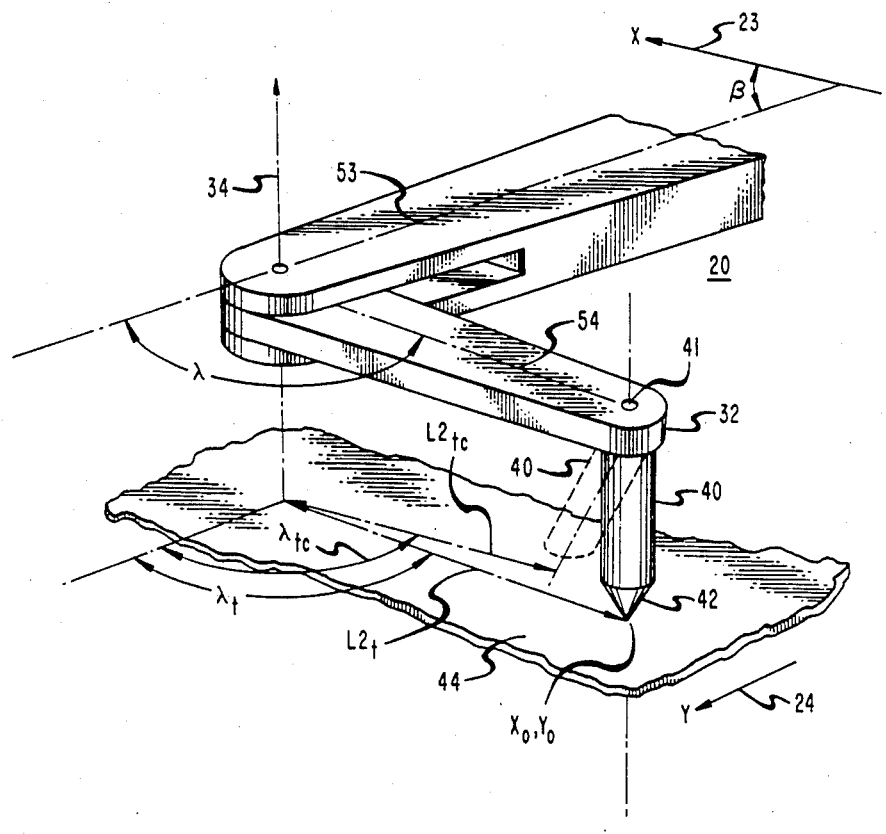
FIG. 2 is an enlarged view of a portion of the robot of FIG. 1 showing a tool affixed to one of a pair of robot links.

Another piece of data required for the kinematic model is the location of the axis 41 of the tool 40 in the plane 44, as measured from the axis 34. Referring to FIG. 2, the location of the tool axis 41 in the plane 44 can be given by a distance $L2_t$ and an angle $\lambda_t$. The distance $L2_t$ is measured along a line in the plane 44 passing between the points at which the tool axis 41 and the axis 34 intersect the plane. The angle $\lambda_t$ is measured between the line $L2_t$ and a plane (not shown) passing through the axis 34 and a line 53 running longitudinally down the center of the link 20.

In practice, the tool 40 is typically mounted to the link 32 so that the tool axis 41 nominally intersects a line 54 passing horizontally down the center of the link. The axis 41 of the tool is assumed to be parallel to the axis 34 so $\lambda_t$ is assumed to equal $\lambda$ where $\lambda$ is the angle between the horizontal centerlines 53 and 54 of the links 20 and 32. As seen in FIG. 2, the angle between the centerline 53 of the link 20 and a plane (not shown) passing the x axis 23 and the z axis 15 (see FIG. 1) is defined as $\beta$.

If the tool tip 42 is located within the plane 44 at the coordinates $x_o, y_o$ along the x and y axes 23 and 24, the angles $\beta$ and $\lambda$ can be defined in terms of the coordinates $x_o, y_o$ as follows:

$$\beta = [\tan^{-1}(y_o/x_o)] \pm \tan^{-1}\left\{\frac{[k(k - L1)(k - L2_t)(k - L)]^{\frac{1}{2}}}{[L1^2 + L^2 - L2_t^2]}\right\} \quad (1)$$

$$\lambda = \pi \pm \tan^{-1}\left\{\frac{4[k(k - L1)(k - L2_t)(k - L)]^{\frac{1}{2}}}{(L1^2 - L2_t^2)}\right\} \quad (2)$$

with L given by $$L = (x_o^2 + y_o^2)^{\frac{1}{2}} \quad (3)$$

and K given by $$K = \tfrac{1}{2}(L1 + L2_t + L) \quad (4)$$

Figure 3:
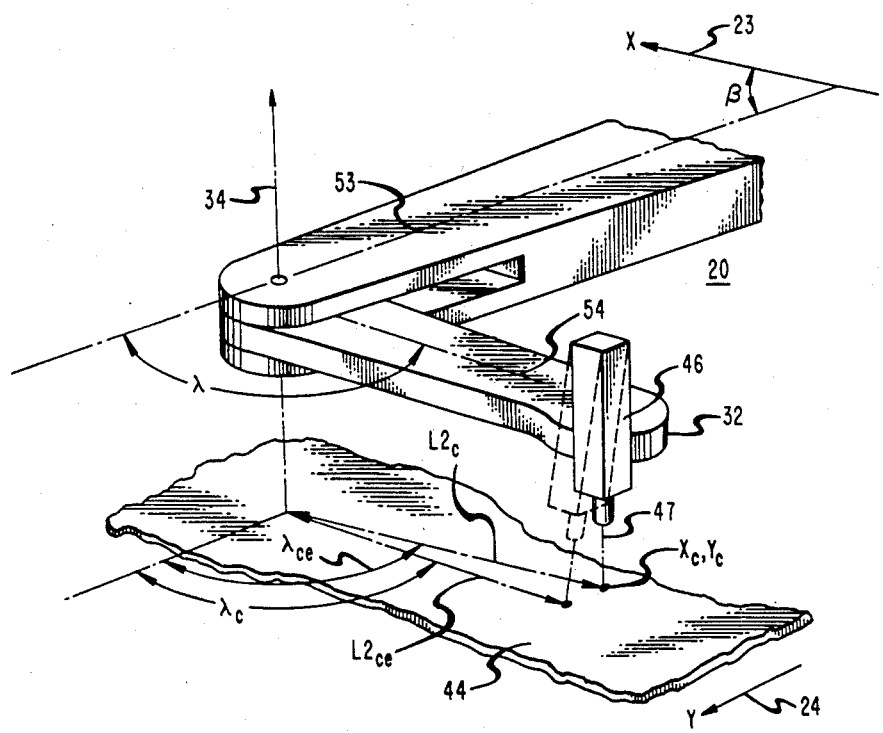
FIG. 3 is an enlarged view of a portion of the robot of FIG. 1 showing a television camera affixed to one of the pair of links.

Referring to FIG. 3, Eqs. (1)–(4) can also be used to transform a pair of coordinates $x_c, y_c$, representing the desired location of the point of intersection of the axis 47 of the television camera 46 with the plane 44, into the corresponding angular position of the links 20 and 32. In order to use Eqs. (1)–(4) to make such a transformation, the value $L2_t$ must be replaced with $L2_c$, which, as seen in FIG. 3, corresponds to the length of a line in the plane 44 running between the points where the axis 47 and axis 34 each intersect the plane.

Even when $L2_c$ is substituted for $L2_t$, the value of $\lambda$ obtained from Eq. (2) will not truly represent the angular separation between the links 20 and 32 required to locate the axis 47 at the coordinates $x_c, y_c$ in the plane 44. Typically, the axis 47 of the television camera 46 does not intersect the horizontal centerline 54 of the link 32 as does the axis 41 of the tool 40 (see FIG. 2). In the exemplary embodiment shown in FIG. 3, the axis 47 of the television camera 46 of FIG. 3 is laterally offset from the horizontal centerline 54 of the link 32. Thus, the angle $\lambda$ between the centerlines 53 and 54 of the links 20 and 32, respectively, will differ from an angle $\lambda_c$ between the line in the plane 44 whose length is $L2_c$ and a plane (not shown) passing through the axis 34 and the centerline 53 of the link 20. The difference between $\lambda$ and $\lambda_c$ is constant and is known to the kinematic model. The angle $\lambda_c$ together with the distance $L2_c$ serves to define the location in the plane 44 of the axis 47, as measured from the axis 34.

To assure a high addressable accuracy for the robot 10, great care is taken to make sure that the kinematic model is accurate. However, inaccuracies are often present for a variety of reasons. For example, the kinematic model of the robot 10 assumes that the axes 41 and 47 of the tool 40 and the television camera 46, respectively, are each parallel to the axes 15 and 34. Referring to FIG. 2, the tool 40 may initially be, or may later become mis-mounted on the link 32 so that the tool will actually appear as shown in phantom, rather than the solid lines, with the axis 41 thereof being skewed relative to the axis 34. The degree to which the axis 41 is skewed relative to the axis 34 has been greatly exaggerated for the purposes of illustration.

When the tool 40 is mis-mounted in the manner shown in phantom in FIG. 2, the distance in the plane 44 between the points at which the tool axis 41 and the axis 34 each intersect the plane will be given by $L2_{te}$ rather than $L2_t$. Similarly, the angle between the line whose length is $L2_{te}$ and the plane passing through the axis 34 and the centerline 53 of the link 20 will be given by $\lambda_{te}$ rather than $\lambda_t$. Thus, the position of the tool axis in the plane 44 is given by the distance $L2_{te}$ and the angle $\lambda_{te}$ rather than by $L2_t$ and $\lambda_t$, respectively, when the tool 40 is mis-mounted. In order for the robot 10 of FIG. 1 to position the tool axis 41 (and hence the tool tip of FIG. 1) at the coordinates $x_o, y_o$ in the plane 44 of FIG. 2, the value of $L2_{te}$ would have to be substituted for $L2_t$ in Eqs. (1), (2) and (4). Then, the resultant value of $\lambda$ computed from Eq. (2) would then have to be augmented by the algebraic difference between $\lambda_t$ and $\lambda_{te}$.

Referring to FIG. 3, the television camera 46 may also initially be, or later become, mis-mounted on the link 32. Thus, the television camera 46 will actually appear as shown in the phantom rather than the solid lines, with the axis 47 of the camera being skewed relative to the axis 34. When the camera 46 is mis-mounted, the location of the axis 47 in the plane 44 relative to the axis 34 will be given by the distance $L2_{ce}$ and the angle $\lambda_{ce}$ rather than by the value of $L2_c$ and the angle $\lambda_c$ obtained from the kinematic model.

Referring to FIG. 1, the robot 10 is provided with a measuring system 55 for sensing the distance of the tool tip 42 (hence, the tool axis 41) and the axis 47 within the plane 44 from a known location therein. The measuring system 55 enables the control system 50 to correct for an error, if any, in the kinematic model due to shifting of the tool 40 and the television camera 46 on the link 32. The measuring system 55 includes a vision system 56, which, in an exemplary embodiment, comprises a model P256 vision system manufactured by IRI Corp., Carlsbad, Calif. The vision system 56 is coupled to the television camera 46 for processing the output signal thereof to determine the location, within the plane 44, of a pin 58, fixedly mounted within the plane 22, relative to the center of the viewing area 48.

The vision system 56 is also coupled to a second television camera 60 which is fixedly mounted within the plane 22. The television camera 60 has an optical axis 61 which is typically, although not necessarily, aligned parallel to the axes 15 and 34 so that the camera looks upwardly at the plane 44 to capture the image within a viewing area 62 in the plane enclosed by phantom lines. The output signal of the camera 60 is processed by the vision system 56 to determine the location of the tip 42 of the tool 40 relative to the center of the viewing area 62 which coincides with the axis 61 of the camera.

The vision system 56 supplies the control system 50 with data indicative of the location of the pin 58 and the tool tip 42 relative to the center of the viewing areas 48 and 62, respectively. From this information, the control system 50 calculates, and compensates for, the error in the kinematic model arising from a shift in the tool 40 and camera 46 on the link 32, causing the axes 41 and 47 to be skewed relative to the axis 34. The technique used by the control system 50 to calculate, and compensate for, the error in the kinematic model of the robot 10 relies on a trait exhibited by all SCARA robots known as "manipulator redundancy." Manipulator redundancy refers to the ability of the robot 10 to nominally place the tip 42 of the tool 40, or the axis 47 of the television camera 46, in the same position in the plane 44 while the links 20 and 32 are in each of two separate angular configurations referred to as "right-hand" and "left-hand" modes, shown in FIGS. 4 and 5, respectively.

Figure 4:
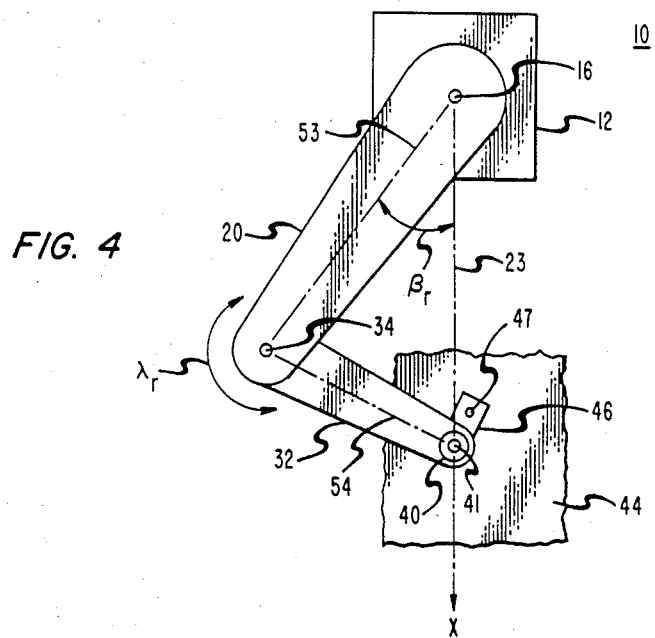
FIGS. 4 and 5 are each a simplified plan view of the robot of FIG. 1 showing the links thereof positioned in right-hand and left-hand modes, respectively.

When the links 20 and 32 are in the right-hand mode, as shown in FIG. 4, the angular orientation of the tool tip 42, with respect to the frame of reference f in the base 12 (see FIG. 1) can be expressed by an angle $\gamma_{tr}$ (not shown in FIG. 4). The angle $\gamma_{tr}$ is given by the sum of the angle $\beta_r$ between the link 20 and the plane passing through the x axis 23 and the z axis 15 and the angle $\lambda_r$ between the centerlines 53 and 54 of links 20 and 32, respectively. The angles $\beta_r$ and $\lambda_r$ are given by Eqs. (1) and (2), respectively, when the second term in each equation is made negative.

Figure 5:
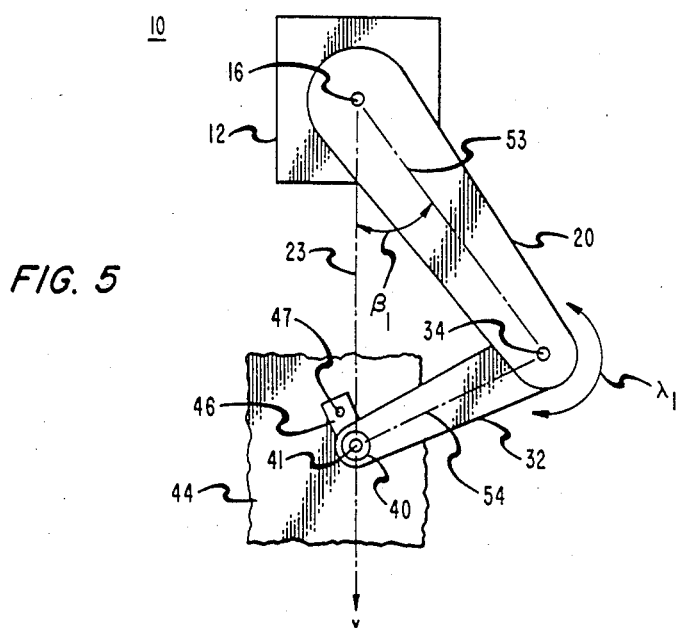

The angular orientation of the tool 40 in the left-hand mode shown in FIG. 5 is defined by the angle $\gamma_{tl}$ (not shown in the figure) which is given by the sum of $\beta_l$ and $\lambda_l$. The angles $\beta_l$ and $\lambda_l$ are given by Eqs. (1) and (2), respectively, when the second term of each equation is made positive. The angular orientation of the camera 46 in both the right-hand and left-hand modes can be represented by $\gamma_{cr}$ and $\gamma_{cl}$, respectively (not seen in FIG. 4 or 5). The angles $\gamma_{cr}$ and $\gamma_{cl}$ are obtained in the same manner as $\gamma_{tr}$ and $\gamma_{tl}$ except that the values of $\lambda_r$ and $\lambda_l$ used to compute $\gamma_{cr}$ and $\gamma_{cl}$, respectively, must be adjusted to account for the known lateral offset of the axis 47 of the camera 46 from the axis 41 of the tool 40.

When the kinematic model of the robot 10 is correct, then the tip 42 (see FIG. 1) and the axis 47 of the television camera 46 remain at the same location in the plane 44 when the links 20 and 32 have been switched between the right-hand and left-hand modes shown in FIGS. 4 and 5. However, if the kinematic model of the robot 10 is incorrect due to a shift in the position of the tool 40, then, when the links 20 and 32 are switched from the right-hand to left-hand modes or vice versa, the location of the tip 42 changes. If the position of the television camera 46 on the link 32 has shifted so that the kinematic model is inaccurate, then the position of the camera axis 47 in the plane 44 does not remain the same when the links 20 and 32 are switched from the right-hand to the left-hand modes or vice versa.

Regardless of the accuracy of the kinematic model, physically there will always be some point on the link 32, designated as the control point 64 (see FIG. 1), whose position, as seen from a fixed location in the plane 44 therebeneath, remains the same while the links 20 and 32 of the robot 10 are in the right-hand mode or the left-hand mode. For purposes of illustration, it is assumed that an error exists in the kinematic model as to the location of the axis 47 in the plane 44. Therefore, the location where the control point 64 registers in the plane 44 will not be coincident with the location in the plane of the axis 47. Were there no error, the location where the control point 64 registers would be coincident with the location in the plane 44 of the axis 47.

Figure 6:
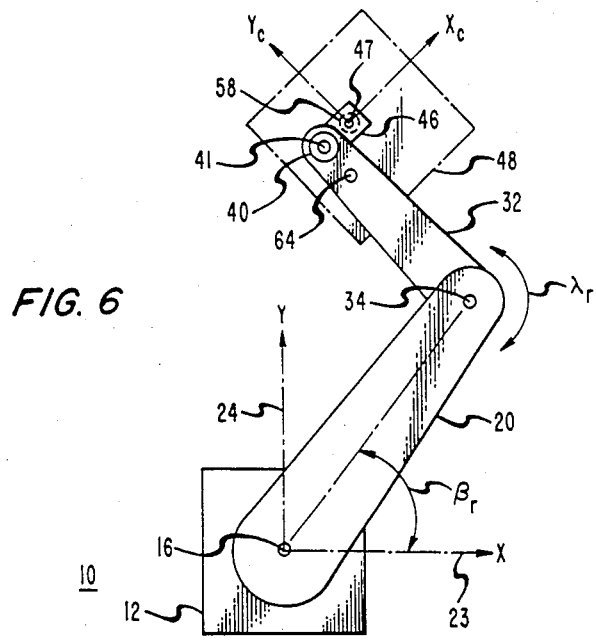
FIG. 6 is a simplified plan view of the robot of FIG. 1 depicting the lateral position of the television camera carried by one of the robot links relative to a fixed datum point when the links are positioned in the right-hand mode.

Correction of the kinematic model of the robot 10 for an error in the location of the axis 47 of the television camera 46 in the plane 44 is achieved by adjusting the kinematic model so the location in the plane where the control point 64 and the axis 47 appear are coincident. To adjust the kinematic model to achieve the above-described coincidence, the links 20 and 32 are first placed in the right-hand mode, as seen in FIG. 6, to locate the camera 46 directly above the pin 58 (shown in phantom). In this way, the pin 58 (see FIG. 1) is in registration with the center of the viewing area 48. In order to rotate the links 20 and 32 to center the television camera 46 over the pin 58, the control system 50 of FIG. 1 relies on data from the vision system 56 of FIG.

1 indicative of the location of the pin from the center of the viewing area 48.

Figure 7:
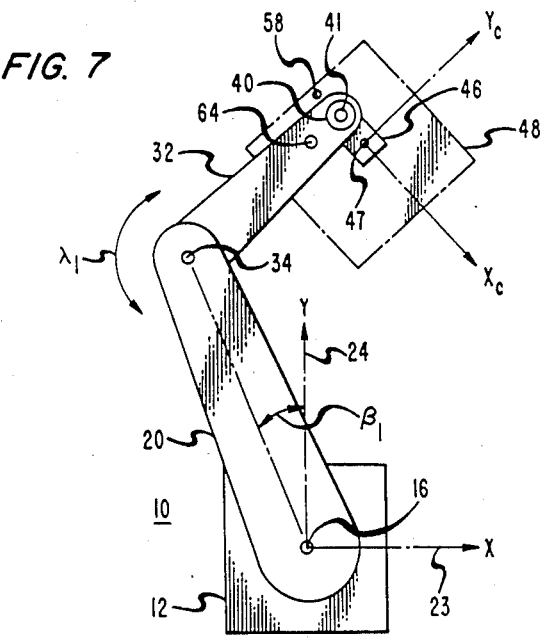
FIG. 7 is a simplified plan view of the robot depicting the lateral position of the camera relative to the datum point when the links are positioned in the left-hand mode.

Next, the links 20 and 32 are switched from the right-hand mode as shown in FIG. 6 to the left-hand mode shown in FIG. 7. The position of the pin 58 relative to the center of the viewing area 48 is recorded by the vision system 56 of FIG. 1. If an error exists in the kinematic model as to the location of the camera axis 47 in the plane 44, then the position of the pin 58 in the viewing area 48 shifts when the links 20 and 32 are switched between the right-hand and left-hand modes. This may be seen by comparing FIGS. 6 and 7.

In order for the pin 58 to appear at the same position in the viewing area 48 in both the right-hand and left-hand modes, the kinematic model must be compensated. As discussed previously with respect to FIG. 3, the location in the plane 44 of the axis 47 of the camera 46, and hence, the center of the viewing area 48 of FIG. 1, is known to the kinematic model in terms of the distance $L2_c$ and the angle $\lambda_c$. However, when the camera 46 is mis-mounted, the distance and angle which define the location of the axis 47 in the plane 44 of FIG. 3 relative to the axis 34 are given by $L2_{ce}$ and $\lambda_{ce}$, respectively. Thus it is necessary to compensate the values of $L2_c$ and $\lambda_c$ known to the kinematic model by a pair of values $\Delta L2_c$ and $\Delta \lambda$, respectively, to equal $L2_{ce}$ and $\lambda_{ce}$, respectively.

Figure 8:
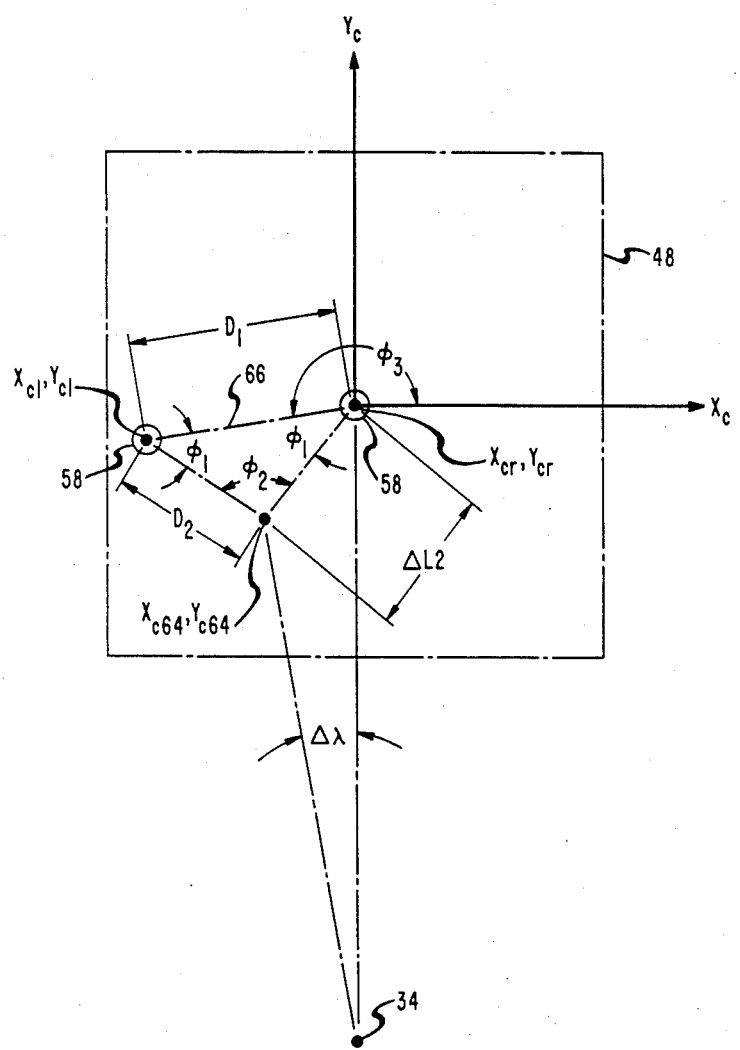
FIG. 8 is an enlarged illustration of the field of view of the camera carried by the robot, showing the position of the datum point, as seen by the camera, in each of the right-hand and left-hand modes.

The values of $\Delta L2_c$ and $\Delta \lambda$ can be obtained from the difference between $\gamma_{cr}$ and $\gamma_{cl}$ and from the shift in the position of the pin 58 within the area 48 when the links 20 and 32 are switched between the right- and left-hand modes. Referring to FIG. 8, there is shown an enlarged illustration of the viewing area 48 of the television camera 46 (see FIG. 1) showing the location therein of the pin 58 when the links 20 and 32 are placed in the right- and left-hand modes. The relative location of the pin 58 within the viewing area 48 can be referenced relative to a pair of orthogonal axes $x_{cl}$ and $y_{cl}$, whose origin coincides with the center of the viewing area.

The coordinate position of the pin 58 along the axes $x_c$ and $y_c$, when the robot links 20 and 32 of FIGS. 6 and 7 are in the right-hand and left-hand modes, respectively, is given by $(x_{cr}, y_{cr})$ and $(x_{cl}, y_{cl})$, respectively. Since the television camera 46 of FIG. 1 is centered above the pin 58 in the right-hand mode, as seen in FIG. 6, the coordinates $(x_{cr}, y_{cr})$, as shown in FIG. 8, are (O,O). The coordinates $(x_{cl}, y_{cl})$, representing the location of the pin 58 in the left-hand mode, are determined by the control system 50 of FIG. 1 from data supplied thereto by the vision system 56 of FIG. 1.

The distance $(D_1)$ between the coordinates $(x_{cr}, y_{cr})$ and $(x_{cl}, y_{cl})$, which represents the location of the pin 58 in the right-hand and left-hand modes, respectively, can be expressed by:

$$D_1 - [(x_{cl})^2 + (y_{cl})^2]^{\frac{1}{2}} \tag{5}$$

Referring to FIG. 8, the distance $D_1$ corresponds to the length of the base of an imaginary isosceles triangle 66 (shown in phantom) having its vertices at $(x_{cr}, y_{cr})$, $(x_{cl}, y_{cl})$ and $(x_{c64}, y_{c64})$, the last coordinate pair defining the coordinate location along the $x_c$ and $y_c$ axes of the point in registration with the control point 64 of FIG. 1.

Each of the two sides of the triangle 66, which is of a length $D_2$, makes an angle $\phi_1$ with the base $D_1$ which is given by:

$$\phi_1 = \frac{180 - \phi_2}{2} \tag{6}$$

where $\phi_2$ is the angle between the two sides. The angle $\phi_2$ is equal to the difference between $\gamma_{cr}$ and $\gamma_{cl}$, the angular orientation of the axis 47 of the television camera 46 (see FIGS. 6 and 7) in the right- and left-hand modes, respectively. The values of $\gamma_{cr}$ and $\gamma_{cl}$ can be obtained from the values of $\beta_r$ and $\beta_l$ and $\lambda_r$ and $\lambda_l$ which may be determined from the output signal of the encoders 28 and 38 of FIG. 1. Using the law of sines, the length $D_2$ of each of the sides of the triangle 66 can be derived from $D_1$, the length of the base, and from the angle $\phi_1$ as follows:

$$D_2 = \sin(\phi_1)(D_1/\sin(\phi_2)) \tag{7}$$

The coordinates $(x_{c64}, y_{c64})$ of the control point 64 along the $x_c$ and $y_c$ axes can be determined as follows:

$$x_{c64} = D_2[\cos(\phi_1 + \phi_3)] \tag{8}$$

$$y_{c64} = D_2[\sin(\phi_1 + \phi_3)] \tag{9}$$

where $\phi_3$ is an angle whose value is given by:

$$\phi_3 a \tan 2(y_{cl}/x_{cl}) \tag{10}$$

Once the coordinates $(x_{c64}, y_{c64})$ are known, the value of $\Delta L2$, can be approximated by:

$$\Delta L2 \approx y_{c64} \tag{11}$$

The term $\Delta \lambda$ can be approximated by:

$$\Delta \approx [(x_{64}/L2)(180°/\pi)] \tag{12}$$

The steps of (a) measuring the shift in the position of the pin 58 (FIG. 1) as seen by the camera 46 of FIG. 1 in the right-hand and left-hand modes, and then (b) compensating the kinematic model by the values of $\Delta L2$ and $\Delta \lambda$ computed in accordance with the measured shift of the pin are repeated unitl $\Delta L2$ and $\Delta \lambda$ approach zero. One $\Delta L2$ and $\Delta \lambda$ reach zero, then the location in the plane 44 of the axis 47 of camera 46 coincides with the location in the plane where the control point 64 registers.

In some instances, it is desirable to adjust the television camera 46 so that the area 48 within its field of view lies in a plane (not shown) parallel to but spaced from the plane 44. Regardless of whether area 48 lies within the plane 44, or some plane spaced therefrom, the calibration procedure described above remains the same.

Referring to FIG. 1, compensation of the kinematic model for a shift in the position of the tool 40 is accomplished in a manner almost the same as the way in which the kinematic model was compensated for a shift in the position of the camera 46. To compensate for a shift in the position of the tool 40, the values of $L2_t$ and $\lambda_t$ (see FIG. 2) must be adjusted by a pair of values $\Delta L2_t$ and $\Delta \lambda_t$ to equal the values of $L2_{te}$ and $\lambda_{te}$, respectively (see FIG. 2). The values of $\Delta L2_t$ and $\Delta \lambda_t$ can be obtained by measuring the lateral shift in the position of the tool tip 42 from a fixed datum point, such as the center of the viewing area 62 of the television camera 60, when the links 20 and 32 are placed in the left-hand and right-hand modes.

Figure 9:
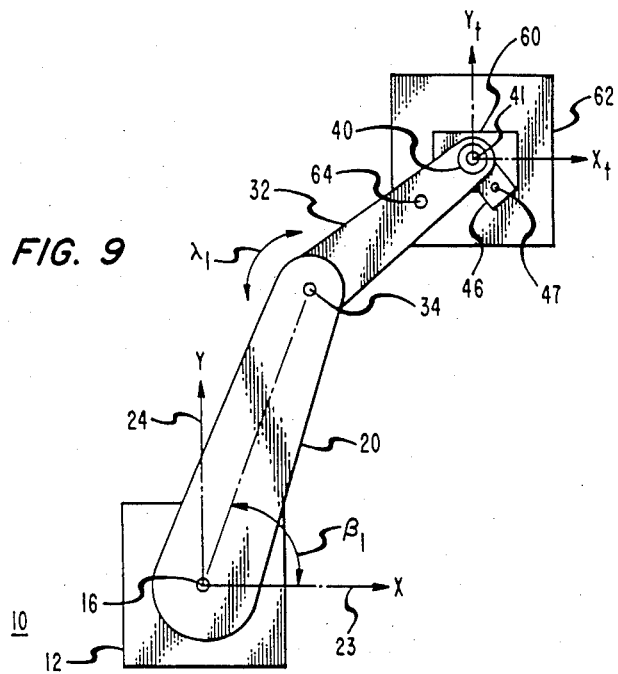
FIG. 9 is a simplified plan view of the robot depicting the position of the tool carried by one of the links thereof relative to a stationary television camera when the links are positioned in the left-hand mode.
Figure 10:
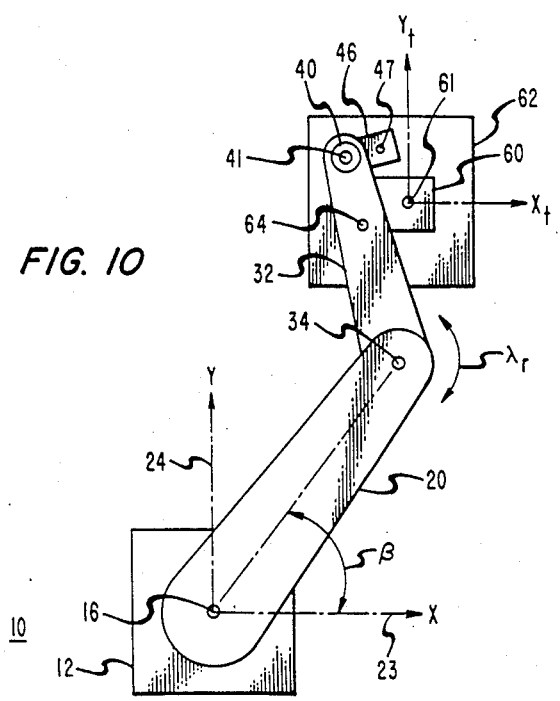
FIG. 10 is a simplified plan view of the robot depicting the position of the tool relative to the stationary television camera when the links are positioned in the right-hand mode.

Referring to FIG. 9, the links 20 and 32 are first placed in the left-hand mode to center the tip 42 (see FIG. 1) directly above the camera 60 (see FIG. 1) so the axis 41 of the tool 40 conicides with the center of the viewing area 62. In order to center the tool tip 42 (see FIG. 1) directly above the camera 60, the control system 50 (see FIG. 1) relies on data from the vision system 56 of FIG. 1 indicative of the location of the tool tip from the center of the viewing area 62. Thereafter, the links 20 and 32 are switched from the left-hand to the right-hand mode as shown in FIG. 10 and the position of the tool tip 42 (see FIG. 1) in the viewing area 62 is recorded by the vision system 56 of FIG. 1. If an error exists in the kinematic model as to the location in the plane 44 (see FIG. 1) of the tool tip 42 (see FIGS. 1 and 2) and hence the tool axis 41 from the axis 34, then, when the links 20 and 32 are switched from the left-hand to the right-hand mode, the position of the tip 42, as seen by the television camera 60, will shift laterally. This may be seen by comparing the relative position of the tool axis 41 in the viewing area 62 in each of FIGS. 9 and 10.

Figure 11:
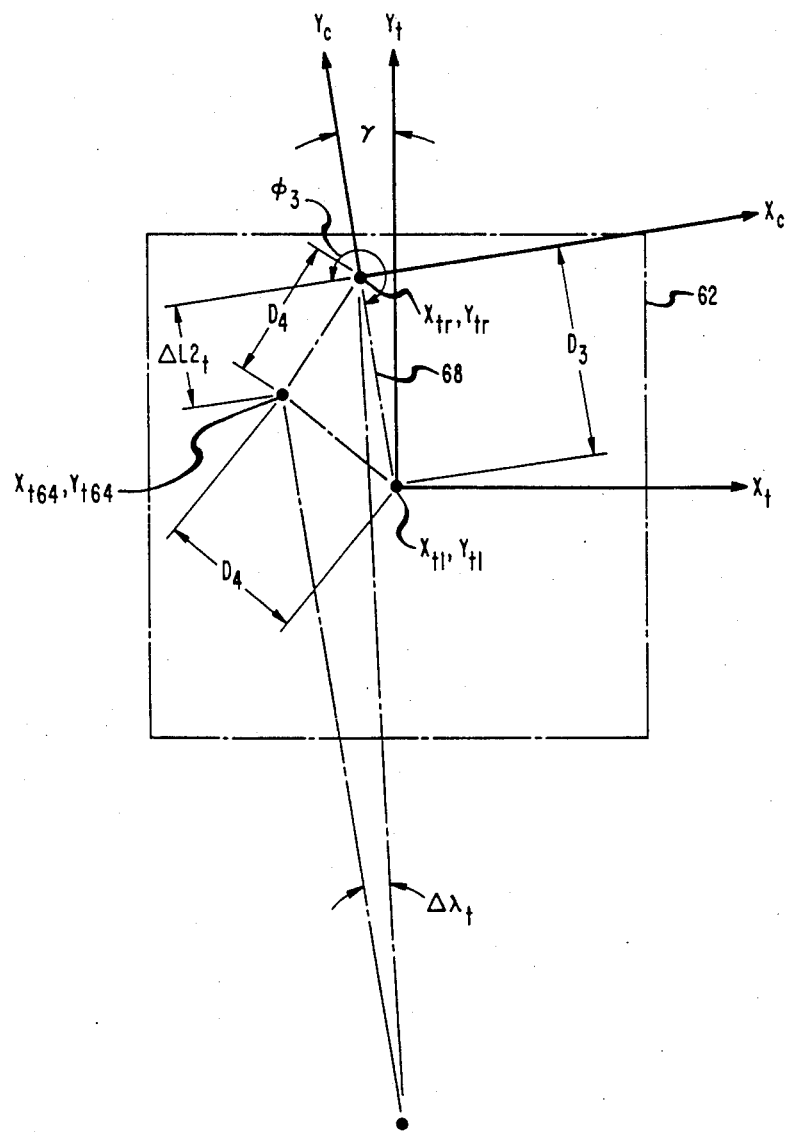
FIG. 11 is an enlarged illustration of the field of view of the stationary television camera showing the position of the tool as seen by the camera when the links are positioned in the right-hand and left-hand modes.

FIG. 11 is an enlarged illustration of the viewing area 62 of the television camera 60 showing the coordinate locations of the tool tip 42 (see only in FIG. 1) in the left-hand and right-hand modes relative to a pair of orthogonal axes $x_{tl}$ and $y_{tl}$ whose origin coincides with the center of the viewing area. The coordinate locations of the tool tip 42 (see FIG. 1) in the left-hand and right-hand modes are given by $(x_{tl},y_{tl})$ and $(x_{tr},y_{tr})$, respectively. Since the tool tip 42 of FIG. 1 is centered above the camera 60 of FIG. 1 when the links 20 and 32 are placed in the left-hand mode, the coordinates $(x_{tl},y_{tl})$ are (O,O). The lateral distance $D_3$ between the tool tip 42 (see FIG. 1) in the left-hand and right-hand modes is given by:

$$D_3 = [(x_{tr})^2 + (y_{tr})^2]^{\frac{1}{2}} \qquad (13)$$

As seen in FIG. 11, the distance $D_3$ represents the length of the base of an imaginary isosceles triangle 68 having its vertices at $(x_{tr},y_{tr})$, $(x_{tl},y_{tl})$ and $(x_{t64},y_{t64})$, the last coordinate pair defining the location of a point along the $x_t$ and $y_t$ axes in registration with the control point 64 on the link 32 of FIG. 1. As can be appreciated, the triangle 68, whose sides are each of a length $D_4$, is constructed in the same fashion as triangle 66 of FIG. 8. Thus, Eqs. (7)–(11) can also be utilized to compute $x_{t64}$ and $y_{t64}$, provided that Eq. (13) is substituted for Eq. (5), and that the value of the angle $\phi_3$ in Eqs. (8) and (9) is defined by:

$$\phi_3 = a \tan 2(y_{tr}/x_{tr}) \qquad (14)$$

rather than by Eq. (10).

The values of $x_{t64}$ and $y_{t64}$ calculated in the manner described above represent the coordinate location, along the $x_t$ and $y_t$ axes, of the point in registration with the control point 64 of FIG. 1. The values of $\Delta L2_t$ and $\Delta \lambda_t$ necessary to compensate the kinematic model can be calculated using Eqs. (10) and (11), but to do so, the values of $x_{t64}$ and $y_{t64}$ must be transformed to the corresponding coordinate locations on the $x_c$ and $y_c$ axes (see FIG. 7). Such a transformation can be accomplished using Eqs. (15) and (16), $$x_{c64} = x_{t64}[\cos(\gamma_{tr})] - y_{t64}[\sin(\gamma_{tr})] - x_{t64} \qquad (15)$$

$$y_{c64} = y_{t64}[\sin(\gamma_{tr})] - x_{t64}[\cos(\gamma_{tr})] - y_{t64} \qquad (16)$$

where $\gamma_{tr}$ is the angular orientation of the tool 40 (see FIG. 1) in the right-hand mode as described previously with respect to FIG. 4.

The steps of measuring the shift in the position of the tool tip 42 (see FIG. 1), and hence the tool axis 41 from the center of the viewing area 62 in the left-hand and then the right-hand modes, and then compensating the kinematic model in accordance therewith are repeated until $\Delta L2_t$ and $\Delta \lambda_t$ approach zero. One $\Delta L2_t$ and $\Delta \lambda_t$ approach zero, then the kinematic model is calibrated for error in the position of the tool 40.

It is to be understood that the embodiments herein described are merely illustrative of the principles of the present invention. Various modifications and changes may be made by those skilled in the art which will embody the principles of the invention and fall within the spirit and scope thereof.

What is claimed is:

1. A method for calibrating a SCARA robot having a first rotatable link, and a second tool-carrying link, rotatably mounted thereto, to compensate for an error in the robot, attributable to an uncertainty in the known length of at least one of the links, comprising the steps of:

(a) placing the links in a first angular configuration, at which a predetermined interior angle is measured between the links, to place the tool at a known location;

(b) placing the links in a second angular configuration, at which an interior angle, equal to said predetermined interior angle, is measured between the links, so that the tool is nominally placed at the same location as before;

(c) measuring the distance of the tool from the known location once the links have been placed in the second angular configuration;

(d) determining the error attributable to the uncertainty in the known length of at least one of the links in accordance with the measured distance and adjusting the robot in accordance with the error; and (e) repeating the steps of (a)-(d) until the measured distance approaches zero.

2. The method according to claim 1 wherein the known location is the center of the viewing area of a stationary television camera and wherein the measuring step comprises the step of processing the output signal of the camera to determine the shift in the position of the tool from the center of the viewing area of the camera when the links are switched from the first to the second configuration.

3. The method according to claim 1 wherein the second tool-carrying link also carries a television camera, and wherein the robot is compensated for an error attributable to the uncertainty in the known location of the camera on the second link by performing the steps of:

(a) placing the links in a first angular configuration, at which a second predetermined interior angle is measured between the links, to center the television camera carried by the second link directly above a fixed datum point;

(b) placing the links in a second angular configuration, at which an interior angle, equal to said second predetermined interior angle, is measured between the links, to nominally center the camera again above the datum point;

(c) processing the output signal of the television camera to determine the shift in the position of the datum point, as seen by the camera, upon switching the links from the first to the second angular configuration;

(d) determining the error in the known position of the camera in accordance with the shift in the position of the datum point as seen by the camera; and (e) repeating the steps of (a)-(d) until the error approaches zero.

4. A method of operating a SCARA robot having a first rotatable link, and a second tool-carrying link rotatably connected thereto, comprising the steps of:

(a) calibrating the robot for errors attributable to an uncertainty in the known length of at least one of the links, in accordance with the shift in the position of the tool relative to a known location when the links are switched between a first angular configuration at which the tool is placed at the known location such that a predetermined interior angle is measured between the links, and a second angular configuration, such that an interior angle, equal to said predetermined interior angle, is measured between the links and such that the tool is nominally placed again at the known location; and (b) rotating the links to move the tool to perform a desired task therewith.

5. The method according to claim 4 wherein the calibrating step comprises the steps of:

(a) placing the links of the robot in the first angular configuration to locate the tool in registration with a datum point;

(b) placing the links in the second angular configuration to nominally place the tool again in registration with the datum point;

(c) determining the error attributable to the uncertainty in the known length of at least one of the links in accordance with the shift in the position of the tool relative to the datum point when the links have been switched from the first to the second angular configuration; and (d) repeating the steps of (a)-(c) until the error approaches zero.

6. The method according to claim 4 wherein the tool is a vacuum pickup tool which is moved to pick up a part and then place it on a substrate.

7. Apparatus for calibrating a SCARA robot having a first rotatable link and a second tool-carrying link rotatably mounted thereto, to compensate for errors in the robot attributable to an uncertainty in the known length of at least one of the links, comprising:

means for placing the links in a first angular configuration, at which a predetermined interior angle is measured between the links, to place the tool at a known location;

means for placing the links in a second angular configuration, at which an interior angle, equal to said predetermined interior angle, is measured between the links, so that the tool is nominally placed again at the known location;

means for measuring the distance of the tool from the known location once the links have been switched to the second angular configuration; and means for determining the error in the robot in accordance with the measured distance and for adjusting the robot in accordance with the determined error.

8. The apparatus according to claim 7 wherein said measuring means comprises:

a television camera mounted at the known location for producing an image of the tool; and a vision system coupled to the television camera for processing the image thereof to determine the distance of the tool from the camera.

* * * * *